(12) United States Patent
Lin (10) Patent No.: US 10,072,341 B2
(45) Date of Patent: Sep. 11, 2018

(54) LIQUID ELECTROLYTIC DEVICE

(71) Applicant: Hsin-Yung Lin, Shanghai (CN)

(72) Inventor: Hsin-Yung Lin, Shanghai (CN)

(73) Assignee: Hsin-Yung Lin, Shanghai (CN)

( * ) Notice: Subject to any disclaimer, the term of this patent is extended or adjusted under 35 U.S.C. 154(b) by 531 days.

(21) Appl. No.: 14/828,765

(22) Filed: Aug. 18, 2015

(65) Prior Publication Data

US 2016/0068972 A1 Mar. 10, 2016

(30) Foreign Application Priority Data

Sep. 10, 2014 (TW) .............................. 103131102 A (51) Int. Cl.
| | |
|---|---|
| *C25B 9/00* | (2006.01) |
| *C25B 9/06* | (2006.01) |
| *C25B 9/16* | (2006.01) |
| *C25B 1/10* | (2006.01) |
| *C25B 9/18* | (2006.01) |
| *C25B 11/02* | (2006.01) |
| *C25B 1/04* | (2006.01) |

(52) U.S. Cl.
CPC .................. *C25B 1/10* (2013.01); *C25B 1/04* (2013.01); *C25B 9/18* (2013.01); *C25B 11/02* (2013.01); *Y02E 60/366* (2013.01)

(58) Field of Classification Search
CPC .... C25B 1/04; C25B 9/00; C25B 9/06; C25B 9/18; C25B 9/16

USPC .......................................................... 204/278
See application file for complete search history.

(56) References Cited

U.S. PATENT DOCUMENTS 8,114,258 B2 * 2/2012 Huber ....................... C25C 3/02
204/194

FOREIGN PATENT DOCUMENTS

TW             M453679 U      5/2013

* cited by examiner

*Primary Examiner* — Zulmariam Mendez
(74) *Attorney, Agent, or Firm* — Foster Pepper PLLC (57) ABSTRACT

The present invention provides a liquid electrolytic device and comprises an electrolytic tank, a separator, a cover, and an electrode plate. The electrolytic tank comprises an upper opening, an under opening, and a hollow portion connected there between for containing liquid water. The separator covers the surface of the electrolytic tank corresponding to the upper opening of the electrolytic tank and comprises a first opening while the cover having a fixed portion and a cover hole disposed on the other surface of the separator. An upper portion of the electrode plate is embedded in the fixed portion of the cover while the under portion thereof is disposed in the hollow portion via the first opening and the upper opening. In practice, the electrolytic tank and the electrode plate are separately connected to a power respectively to electrolyze the liquid water in the electrolytic tank for generating a hydrogen-oxygen gas.

14 Claims, 13 Drawing Sheets

LIQUID ELECTROLYTIC DEVICE

BACKGROUND OF THE INVENTION

1. Field of the Invention

The present invention relates to a liquid electrolytic device, and more particularly, the present invention relates to a liquid electrolytic device which can adjust the quantity of the electrolytic tanks freely and be used to electrolyze liquid water for generating hydrogen-oxygen gas.

2. Description of the Prior Art

People are always paying a great deal of attention on health developments. Many developments in medical technology are often targeted towards treating diseases and prolonging human life. Most of the treatments in the past are passive, which means that they only treat the disease when the disease occurs. These include methods such as operating, medicating, radiation therapy, convalescing chronic diseases, rehabilitation, corrective therapy, or even medical treatment for cancer. But in recent years, much of the research from medical experts are gradually moving towards preventive medical methods, such as research on healthy food, screening and preventing inherited diseases, which actively prevents diseases from occurring in the future. Because of this focus on prolonging human life, many anti-aging and anti-oxidation technologies including skin care products and anti-oxidation food/medicine are gradually being developed and have become increasingly popular to the general public.

Studies have found that there is an instable oxygen species (O+), also known as free radicals, in the human body. The free radicals usually generated due to diseases, diet, environment and one's lifestyle, but can be excreted in the form of water by reacting with the inhaled hydrogen. With this method, the amount of free radicals in the human body can be reduced, thereby restoring the body condition from an acidic state to an alkaline state, achieving an anti-oxidation, anti-aging and beauty health effect, and even eliminating chronic diseases. Furthermore, there are also clinical experiments showing that patients who need to inhale a high concentration of oxygen for an extended period of time would experience lung damage and the lung damage can be ameliorated by inhaling hydrogen. In summary, the hydrogen-containing gas is regarded as a type of health gas that can be obtained from liquid water.

Figure 9:
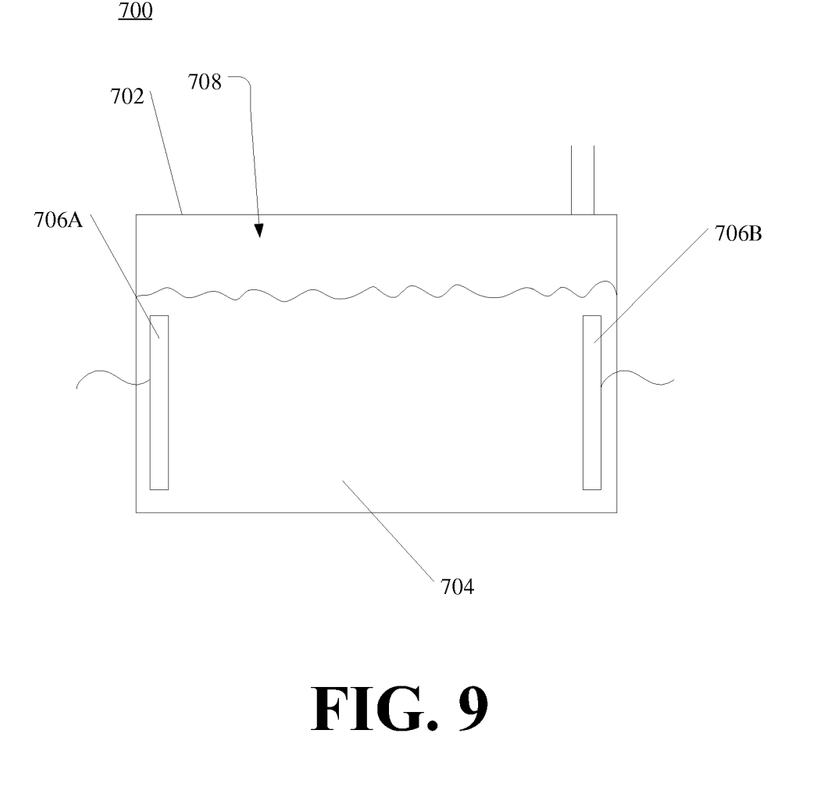
FIG. 9 shows a schematic diagram of the structure of the traditional hydrogen-oxygen electrolytic device.

Please refer to FIG. 9. FIG. 9 shows a schematic diagram of the structure of the traditional hydrogen-oxygen electrolytic device 700. The electrolytic device 700 comprises an electrolytic tank 702. The electrolytic tank 702 comprises electrodes 706A and 706B. The electrodes 706A and 706B are a negative electrode and a positive electrode respectively, coupled to a power source (not shown in FIG. 9) for supplying power to electrolyze water. The electrolytic water 704 in the electrolytic tank 702 is going to be electrolyzed when going through the electrified electrodes 706A and 706B. And then the negative pole will generate hydrogen and the positive pole will generate oxygen. The generated hydrogen and oxygen will be released on the top of the electrolytic tank 702 and then forms a hydrogen-oxygen mixed gas 708. The hydrogen-oxygen mixed gas 708 is outputted from the outputting tube of the electrolytic tank 702 for following using. However, the quantity of the hydrogen-oxygen gas generated from this kind of electrolytic device is normally limited by the shape and structure of the electrolytic tank.

SUMMARY OF THE INVENTION

Therefore, an aspect of the present invention is to provide a liquid electrolytic device, used to electrolyze liquid water and generate hydrogen-oxygen gas. At the same time, the liquid electrolytic device has a plurality of electrolytic tanks which can be installed or uninstalled freely for controlling the generating rate of the hydrogen-oxygen gas.

The present invention provides a liquid electrolytic device, comprising an electrolytic tank, a separator, a cover body, and an electrode plate. The electrolytic tank comprises an upper opening, an under opening, and a hollow portion, wherein the upper opening is connected with the under opening through the hollow portion. The hollow portion is adapted to contain liquid water. The electrolytic tank is an electric conductor. The separator comprises a first opening, wherein the separator is covered on electrolytic tank corresponding to the surface of the upper opening of the electrolytic tank, wherein the separator is an electric insulator. The cover body is disposed on the other surface of the separator relative to the electrolytic tank, wherein the cover body is an electric conductor and comprises a fixed portion and a cover hole. The cover hole is connected with the two surfaces of the cover body relative to the direction of the separator. The electrode plate has an upper portion and an under portion, wherein the upper portion of the electrode plate is embedded in the fixed portion of the cover body, the under portion of the electrode plate is penetrated into the hollow portion of the electrolytic tank via the first opening of the separator and the upper opening of the electrolytic tank. Wherein the liquid water is inputted into the hollow portion of the electrolytic tank via the under opening, the electrolytic tank and the electrode plate are connected to a power source with an opposite polarity respectively for electrolyzing the liquid water in the electrolytic tank to generate the hydrogen-oxygen gas, wherein the hydrogen-oxygen gas is outputted via the cover hole.

Furthermore, the electrolytic tank can further selectively comprise a valve, connected to the under opening of the electrolytic tank. The electrolytic tank outputs the liquid water through the valve.

According to the statement mentioned above, the liquid electrolytic device of the present invention can selectively comprise a plurality of the electrolytic tanks and further comprise a branch unit, configured between the valve and the under opening of the plurality of the electrolytic tanks and connected with the valve and the under opening of the plurality of the electrolytic tanks, wherein the branch unit is adapted to bypass the liquid water inputted by the valve and then output to the plurality of the electrolytic tanks.

Additionally, the liquid electrolytic device of the present invention can selectively comprise a plurality of the electrolytic tanks and a plurality of the corresponding separators. The cover body comprises a plurality of cover holes, connected to the upper opening of the plurality of the electrolytic tanks respectively. The cover body comprises a confluence unit, wherein the confluence unit is disposed on the other surface of the cover body relative to the electrolytic tank, the confluence unit is connected to the plurality of cover holes, the confluence unit is adapted to mix the gas outputted from the plurality of cover holes and then output to a corresponding gas outputting tube.

Furthermore, the cover body can selectively comprise a gas outputting tube, wherein the gas outputting tube is configured on the other surface of the cover body relative to the electrolytic tank and connected to the corresponding cover hole for receiving the hydrogen-oxygen gas.

Additionally, the cover body and the corresponding surface of the separator can selectively have a first embed structure and a corresponding second embed structure respectively, wherein the first embed structure is embedded with the second embed structure, the fixed portion and the cover hole are enclosed by the first embed structure, and the first opening of the separator is enclosed by the second embed structure.

Additionally, the electrolytic tank can selectively further have a tongue portion. The tongue portion is extended from a side surface of one end of the electrolytic tank relative to the separator and along to the direction of the normal vector of the side surface. The tongue portion has a plurality of vertical vias. The plurality of vertical vias are adapted to be fixed with the cover body through a fixing unit.

According to the statement mentioned above, the electrolytic tank and the corresponding surface of the separator can selectively have a third embed structure and a corresponding forth embed structure respectively, wherein the upper opening of the electrolytic tank is enclosed by the third embed structure, and the first opening of the separator is enclosed by the forth embed structure.

Additionally, the electrolytic device of the present invention can selectively comprise a plurality of the electrolytic tanks. The tongue portion of the plurality of the electrolytic tanks comprise a first jut and a second jut respectively, wherein the first jut and the second jut is extended from the side surface of the tongue portion along to the two opposite directions respectively. The first jut of the electrolytic tank is embedded with the adjacent second jut of the electrolytic tank for fixing.

Additionally, the separator can selectively have at least one horizontal pit. The horizontal pit is formed by denting inside from a side surface of the separator. The plurality of the horizontal pit is corresponding to the tongue portion and the vertical vias and the cover hole of the cover body for allowing a fixing unit to pass through the tongue portion and the vertical vias and the cover hole of the cover body through the horizontal pit.

Additionally, the electrolytic device of the present invention can selectively comprise a plurality of the electrolytic tanks and a plurality of the corresponding cover body, wherein the cover body comprises a first wing portion and a second wing portion respectively, extended from the side surface of the cover body along to the two opposite directions respectively, and the first wing portion of the cover body is embedded with the adjacent second wing portion of the cover body for fixing.

According to the statement mentioned above, a connecting unit is set between the first wing portion and the second wing portion. The first wing portion, the second wing portion, and the connecting unit comprise at least one longitudinal via respectively. The first wing portion, the second wing portion, and the connecting unit are embedded with each other and the relative position of the first wing portion, the second wing portion, and the connecting unit can be fixed by a fixing unit through passing through the plurality of longitudinal vias.

To summarize the statement mentioned above, an emphasis of the present invention is to provide a liquid electrolytic device which can adjust the quantity of the electrolytic tanks freely for controlling the generated quantity of the hydrogen-oxygen gas.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1A:
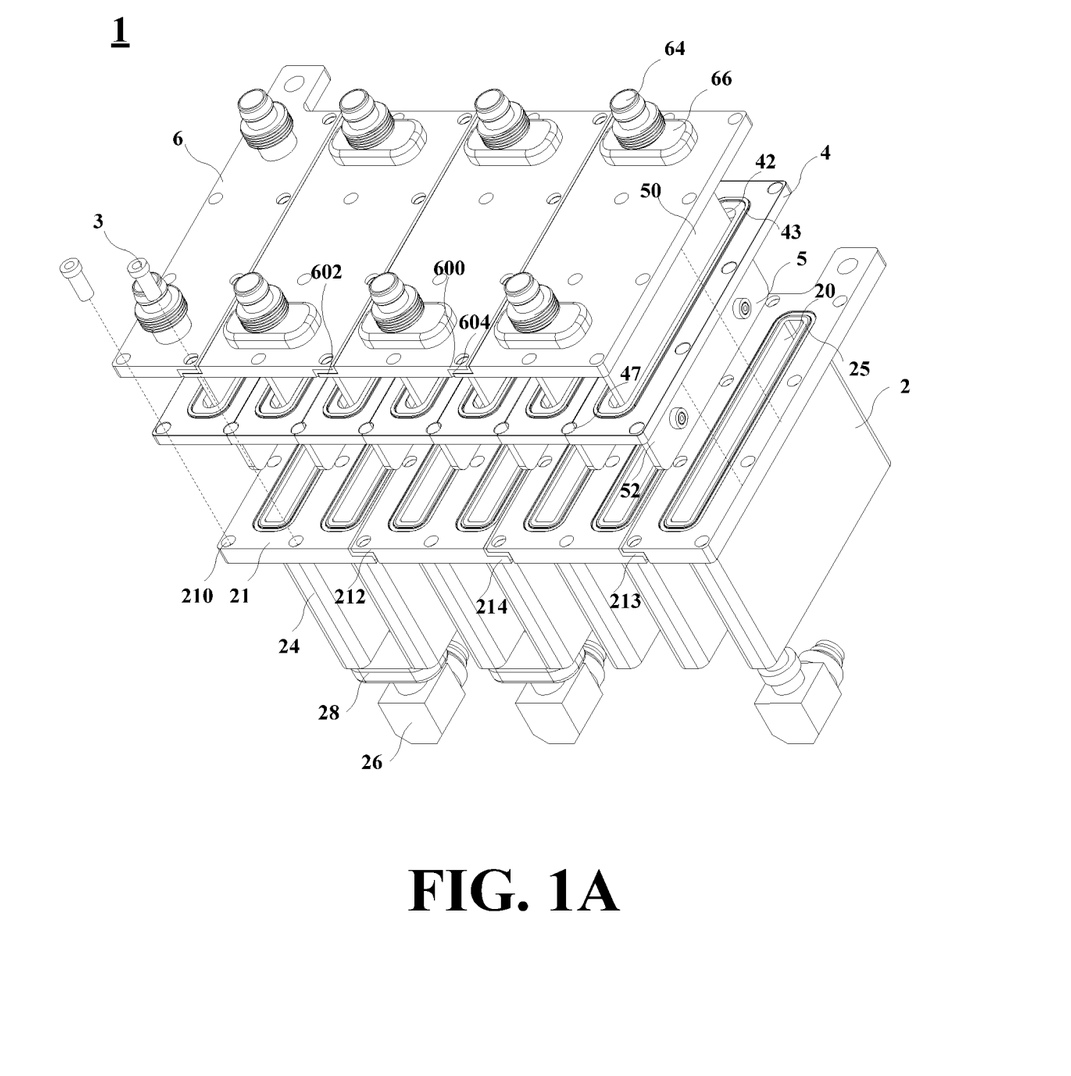
FIG. 1A and FIG. 1B show a schematic diagram of the liquid electrolytic device in an embodiment with different visual angle of the present invention.
Figure 1B:
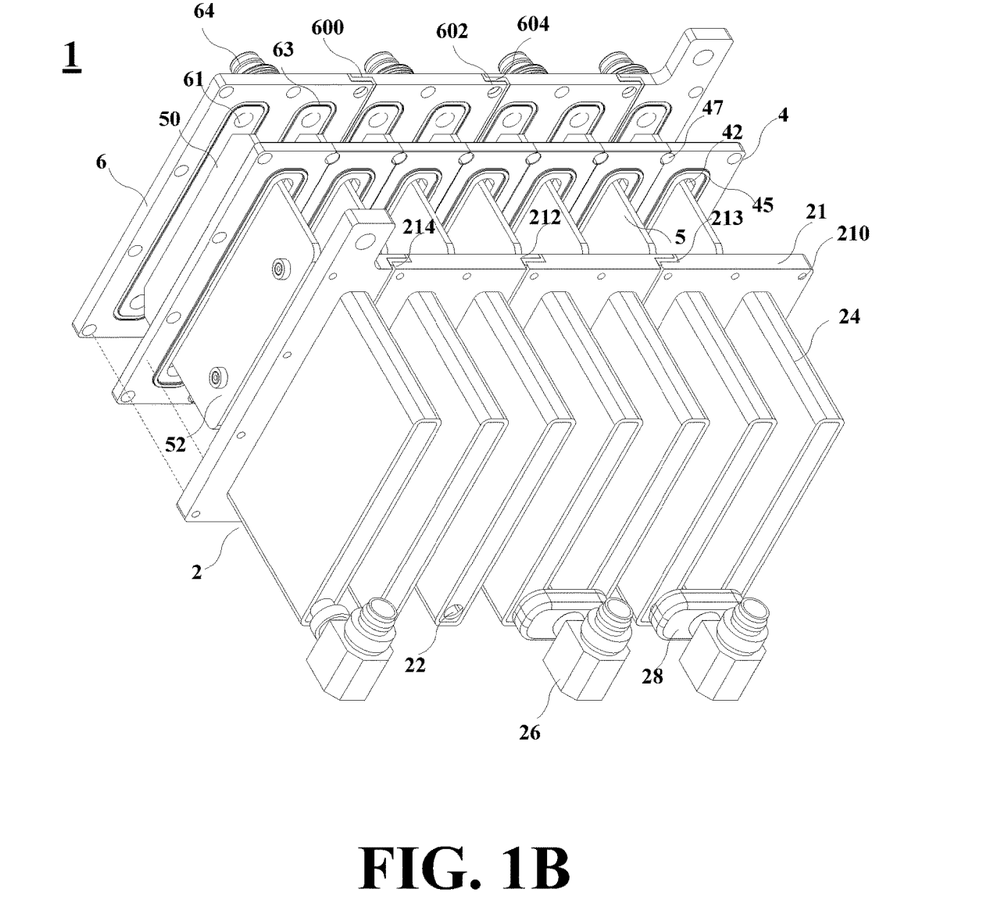
Figure 2A:
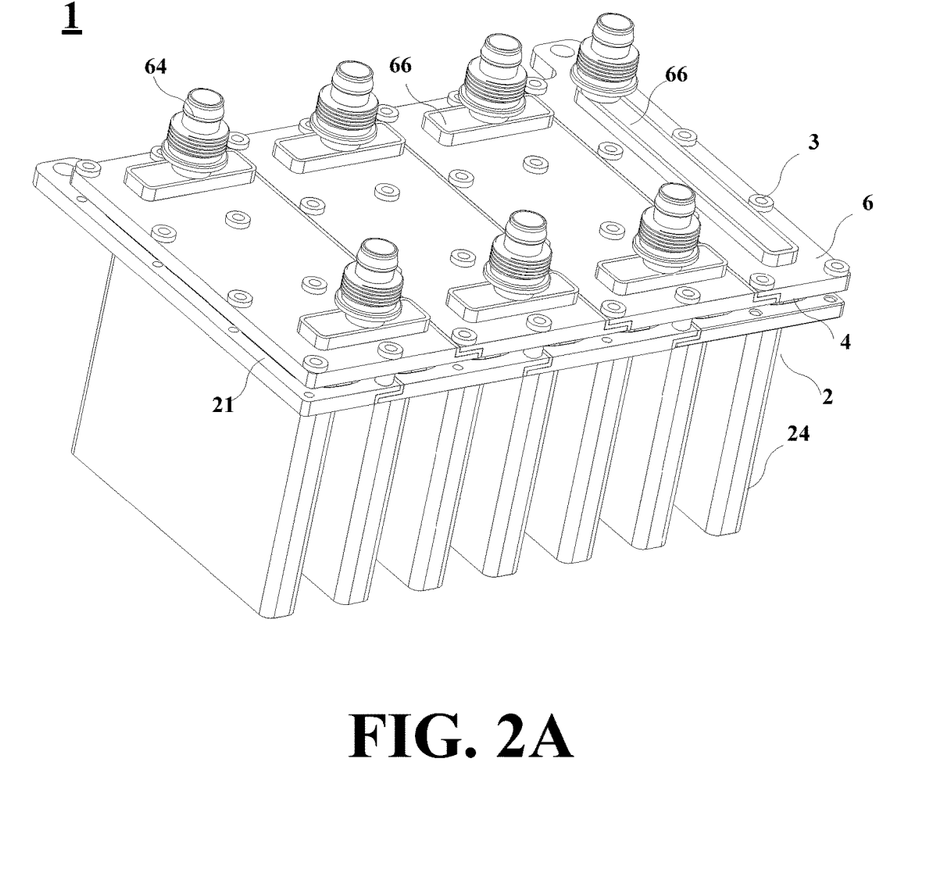
FIG. 2A and FIG. 2B show a schematic diagram of the liquid electrolytic device in another embodiment with different visual angle of the present invention.
Figure 2B:
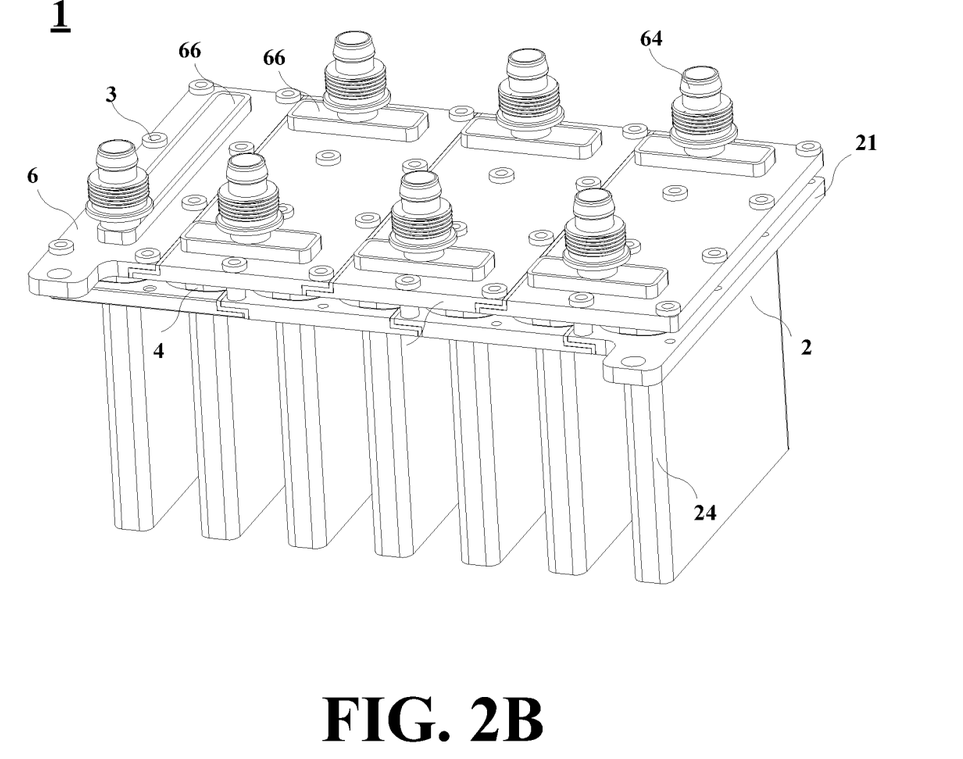
Figure 3A:
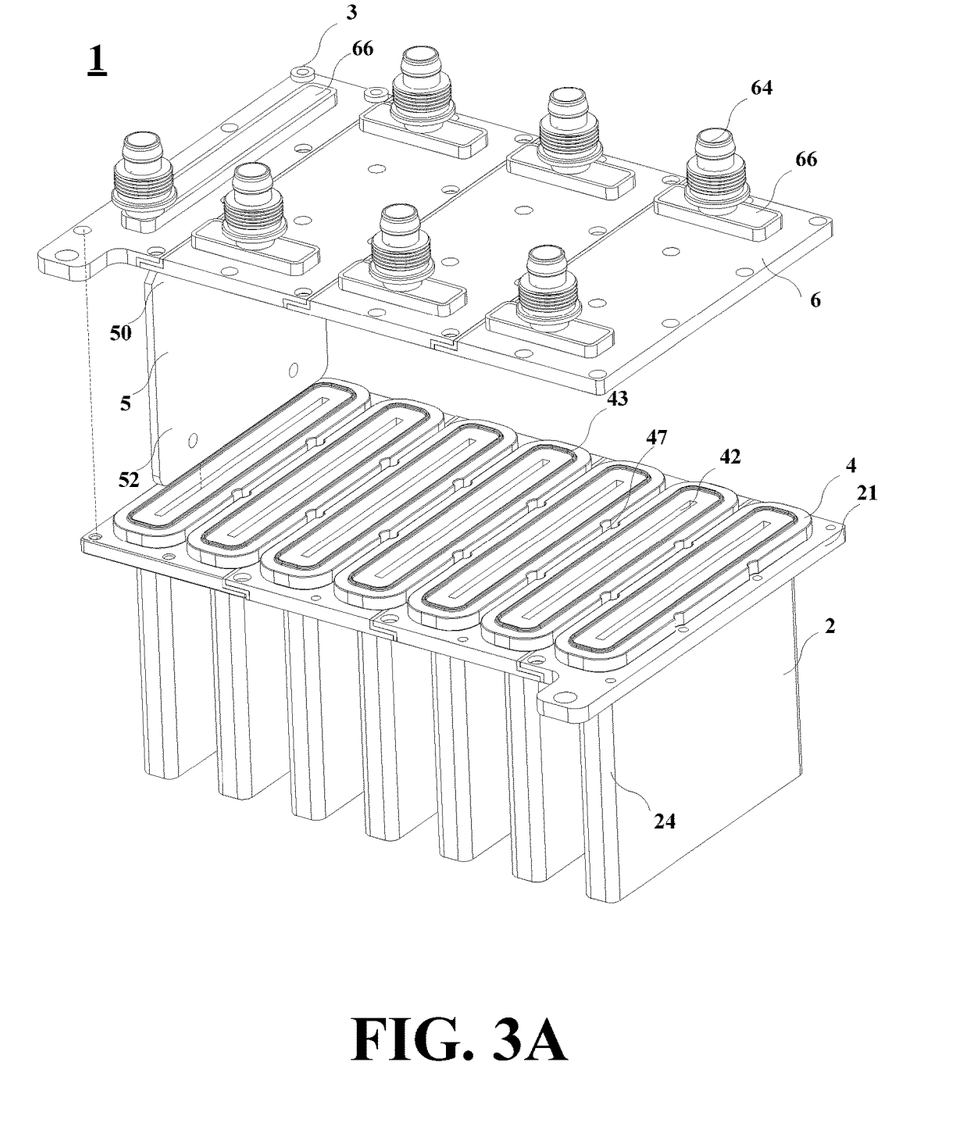
FIG. 3A and FIG. 3B show an explosion diagram of the liquid electrolytic device in FIG. 2A in an embodiment with different visual angle of the present invention.
Figure 3B:
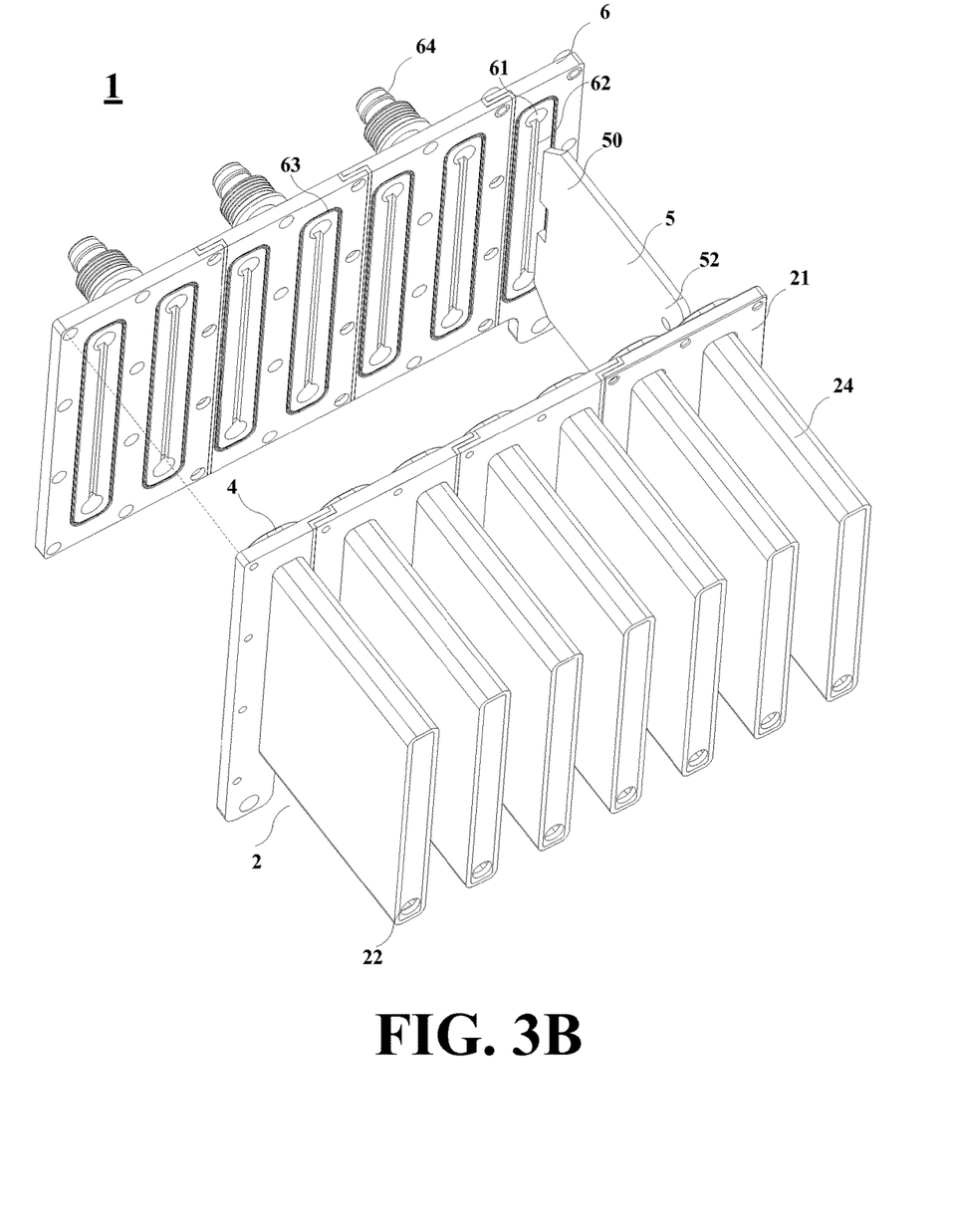

Please refer to FIG. 1 and FIG. 2. FIG. 1A and FIG. 1B show a schematic diagram of the liquid electrolytic device in an embodiment with different visual angle of the present invention. In this embodiment, the liquid electrolytic device 1 approximately comprises an electrolytic tank 2, a separator 4, a cover body 6, and an electrode plate 5. The electrolytic tank 2 and the cover body 6 are electric conductor respectively. The separator 4 is electric insulator. In application, the electrolytic tank 2 and the cover body 6 are connected to a power source with an opposite polarity respectively. The electrode plate 5 electrically coupled to the cover body 6 will electrolyze the water between the electrode plate 5 and the electrolytic tank 2 for generating hydrogen-oxygen gas. The following statement will explain the design of each unit of the present invention respectively.

First, the present invention comprises a plurality of electrolytic tank 2. Each electrolytic tank 2 comprises an upper opening 20, an under opening 22, and a hollow portion 24 respectively. The upper opening 20 is connected with the under opening 22 through the hollow portion 24. The hollow portion 24 of the electrolytic tank 2 is adapted to contain liquid water W. At the same time, the electrolytic tank 2 further comprises a plurality of valves 26 and branch units 28. The valve 26 is connected to the under opening 22 of the electrolytic tank 2. The branch unit 28 is configured between the valve 26 and the under opening 22 of the plurality of the electrolytic tanks 2 and connected with the valve 26 and the under opening 22 of at least one or a plurality of the electrolytic tanks 2, wherein the branch unit 28 is adapted to bypass the liquid water W inputted by the valve 26 and then output to the plurality of the electrolytic tanks 2. In this embodiment, the branch unit 28 is a branch tank. But the branch unit 28 is not limited to this embodiment. In practical application, the branch unit 28 also can be branch tube or other units which has bypassing function. The present invention is not limited to the design mentioned above. When needing, the branch unit 28 mentioned above can be omitted and each electrolytic tank 2 can be filled with liquid water W from outside through independent valve 26 respectively. When the valve 26 is applied by the plurality of electrolytic tanks 2, each electrolytic tank 2 can be filled with liquid water W in need from outside through independent valve 26 respectively. Additionally, for explaining the design of the electrolytic tank, a branch unit 28 and the valve 26 thereof are omitted designedly in FIG. 1A and FIG. 1B. However, in application, the branch unit 28 and the valve 26 thereof should be set on for using.

Figure 6:
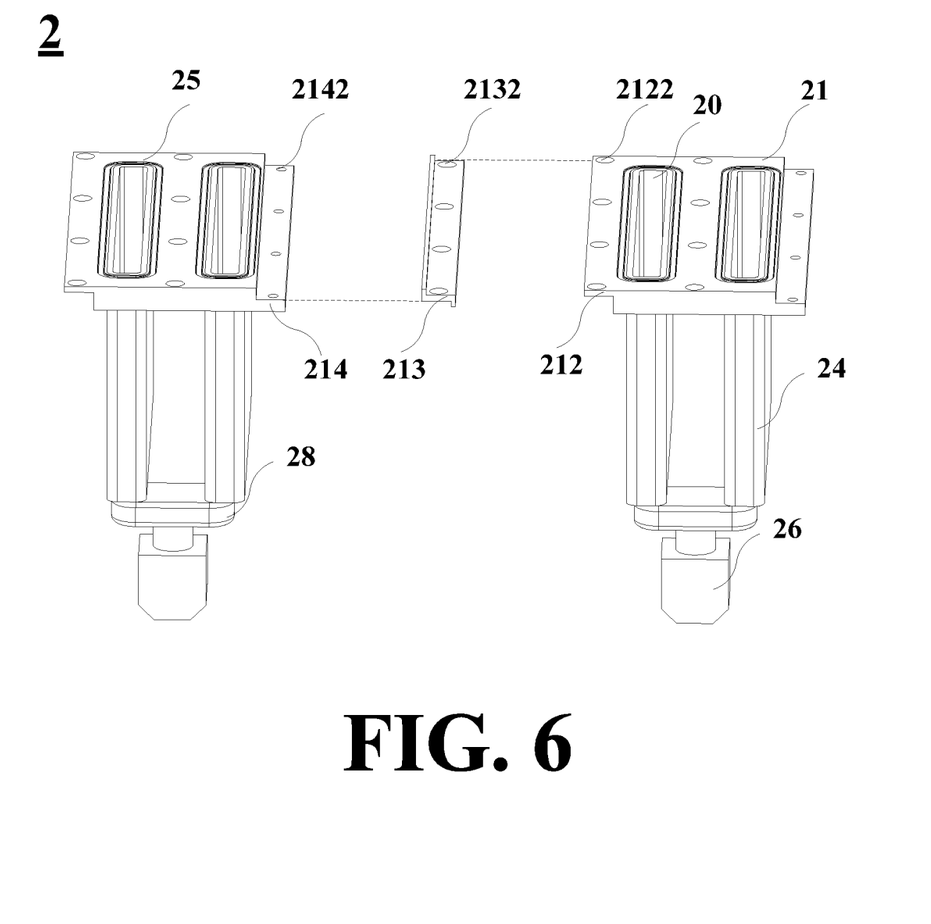
FIG. 6 shows a schematic diagram of the connection relationship of each electrolytic tank of the liquid electrolytic device in FIG. 1A in an embodiment of the present invention.

Additionally, please refer to FIG. 1A, FIG. 1B, and FIG. 6. FIG. 1A and FIG. 1B show a schematic diagram of the liquid electrolytic device in an embodiment with different visual angle of the present invention and FIG. 6 shows a schematic diagram of the connection relationship of each electrolytic tank of the liquid electrolytic device in FIG. 1A in an embodiment of the present invention. The electrolytic device 2 further has a tongue portion 21. The tongue portion 21 is extended from a side surface of one end of the electrolytic tank 2 relative to the separator 4 and along to the direction of the normal vector of the side surface. The tongue portion 21 has a plurality of vertical vias 210 on the top side surface. Each vertical vias 210 is adapted to be fixed with the cover body 6 through a fixing unit 3.

The two sides of each tongue portion 21 comprise a first jut 212 and a second jut 214 respectively. The first jut 212 and the second jut 214 are extended from the side surface of the tongue portion 21 along to the two opposite directions respectively. The first jut 212 of the electrolytic tank 2 is embedded with the adjacent second jut 214 of the electrolytic tank 2. The first jut 212 and the second jut 214 forms a ladder shape. Additionally, in this embodiment, a latching member 213 is set between the first jut 212 and the second jut 214, wherein the latching member 213 forms a ladder shape. Furthermore, the first jut 212, the second jut 214, and the latching member 213 comprise at least one longitudinal via 2122, 2142, 2132 respectively. The first jut 212, the second jut 214, and the latching member 213 are embedded with each other and the relative position of the first jut 212, the second jut 214, and the latching member 213 can be fixed by a fixing unit 3 through passing through the plurality of longitudinal vias 2122, 2142, 2132.

Figure 5:
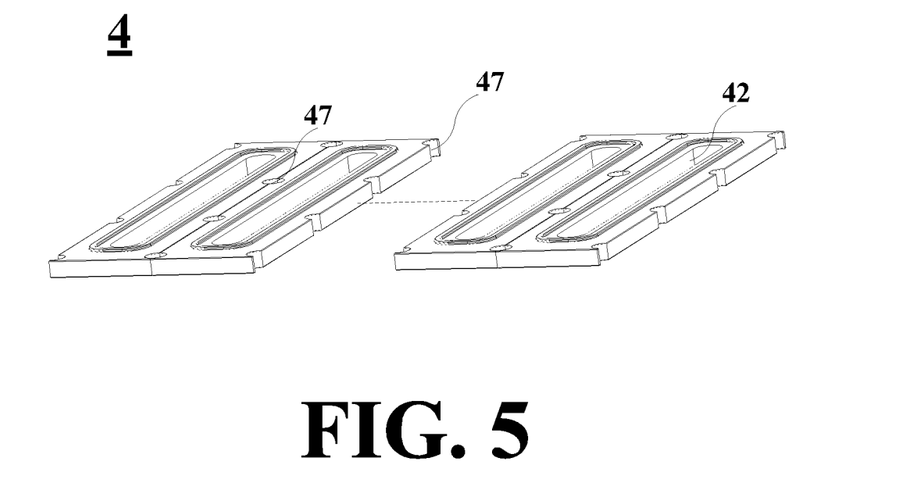
FIG. 5 shows an explosion diagram of the separator of the liquid electrolytic device in FIG. 1A in an embodiment of the present invention.

Please refer to FIG. 5. FIG. 5 shows an explosion diagram of the separator of the liquid electrolytic device in FIG. 1A in an embodiment of the present invention. In this embodiment, the separator 4 of the present invention comprises a first opening 42. Each separator 4 has at least one horizontal pit 47 respectively. The horizontal pit 47 is formed by denting inside from a side surface of the separator 4. In addition, the horizontal pit 47 also can be presented as a via, used for the fixing unit 3 to pass through.

It is worth noting that the separator 4 shown in FIG. 5 is the same with the separator 4 in the embodiment in FIG. 1A and FIG. 1B. In this embodiment, the horizontal pits 47 of the adjacent separators 4 can be doubled. Furthermore, in this embodiment, the scale of the first opening 42 of the separator 4 is bigger than the scale of the electrode plate 5. But the first opening 42 of the separator 4 is relatively smaller than the scale of the upper opening 20 of the electrolytic tank 2, used to separate the electrode plate 5 and the electrolytic tank 2. However, the design of the separator 4 is not limited to the embodiment in FIG. 1A and FIG. 1B. Additionally, the present invention further provides another embodiment. As shown in FIG. 2A, FIG. 2B, FIG. 3A, and FIG. 3B, a gap is remained between the separator 4 and the horizontal pit 47 of the adjacent separator 4 for the fixing unit 3 to pass through. Additionally, in this embodiment, the scale of the first opening 42 of the separator 4 is approximately equal to the scale of the electrode plate 5, which is only for the electrode plate 5 to pass through, wherein the electrode plate 5 can not move by a wide margin in the separator 4, which is used to separate the electrode plate 5 and the electrolytic tank 2 only. Meanwhile, the design of the separator 4 is not limited to the FIG. 2A, FIG. 2B, FIG. 3A, and FIG. 3B. Therefore, the separator 4 can not only provide the insulating function between the cover body 6 and the electrolytic tank 2, but also provide the separating function between the electrode plate 5 and the electrolytic tank 2. It is worth noting that to simplify the figure, FIG. 2A and FIG. 2B designedly disclose one electrode plate 5 only. However, in application, the quantity of the electrode plate 5 can be adjusted by the user.

Please refer to FIG. 1A and FIG. 1B again. The cover body 6 of the present invention comprises a fixed portion 62 and a cover hole 61, wherein the cover hole 61 is connected with the two surfaces of the cover body 6 relative to the direction of the separator 4. The cover body 6 comprises a plurality of cover holes 61 and a confluence unit 66. The cover hole 61 is connected to the two sides of the cover body 6 for guiding liquid from one end to the other end. The confluence unit 66 is disposed on the other surface of the cover body 6 relative to the electrolytic tank 2 and connected to the plurality of cover holes 61. The confluence unit 66 is adapted to mix the gas outputted from the plurality of cover holes 61 and then output to a corresponding gas outputting tube 64, wherein the gas outputting tube 64 is used to mix the gas outputted from the cover hole 61. In this embodiment, the confluence unit 66 is a confluence tank used to mix gas. But the confluence unit 66 of the present invention is not limited to the statement mention above. In practical application, the confluence unit 66 also can be a confluence tube or other units having mixing function. Additionally, the confluence unit 66 can not only be used to mix gas, but also used to mix liquid. The cover body 6 also can be the same with the cover body 6 shown in the figure, selectively comprises a gas outputting tube 64. The gas outputting tube 64 is configured on the other surface of the cover body 6 relative to the electrolytic tank 2 and connected to the corresponding cover hole 61 or confluence unit 66 for receiving the hydrogen-oxygen gas G. When a practical application is with a plurality of electrolytic tanks 2, each electrolytic tank 2 can output the hydrogen-oxygen gas G, generated by electrolyzing liquid water W, through independent gas outputting tube 64.

Figure 4:
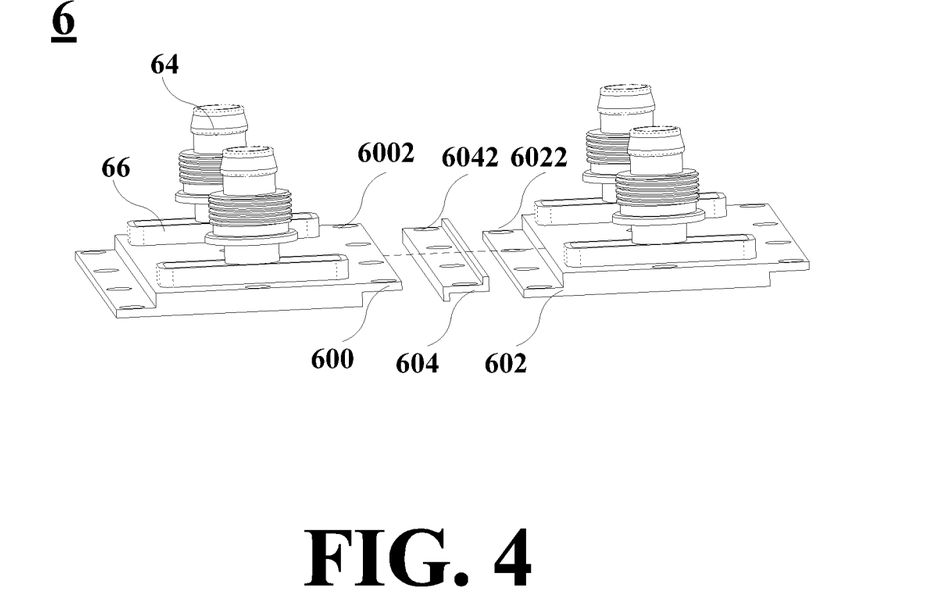
FIG. 4 shows an explosion diagram of the cover body of the liquid electrolytic device in FIG. 1A in an embodiment of the present invention.

More particularly, please refer to FIG. 4. FIG. 4 shows an explosion diagram of the cover body of the liquid electrolytic device in FIG. 1A in an embodiment of the present invention. The cover body 6 can comprise a first wing portion 600 and a second wing portion 602 respectively. The first wing portion 600 and the second wing portion 602 are extended from the side surface of the cover body 6 along to the two opposite directions of the normal vector of the side surface respectively. The first wing portion 600 of the cover body 6 can be embedded with the adjacent second wing portion 602 of the cover body 6 for fixing. In this embodiment, a connecting unit 604 is set between the first wing portion 600 and the second wing portion 602. The first wing portion 600, the second wing portion 602, and the connecting unit 604 comprise at least one longitudinal via 6002, 6022, 6042 respectively. The first wing portion 600, the second wing portion 602, and the connecting unit 604 are embedded with each other and the relative position of the first wing portion 600, the second wing portion 602, and the connecting unit 604 can be fixed by a fixing unit 3 through passing through the plurality of longitudinal vias 6002, 6022, 6042. The fixing unit 3 mentioned above can be a nail, screw, or other elements used to fix we have known in the prior art.

Additionally, the electrode plate 2 is formed by a high-conductivity material with a plate shape. The electrode plate 5 has an upper portion 50 and an under portion 52.

After explain the design of each unit respectively, the following statement will describe the combination method and working theory of each unit.

Figure 8A:
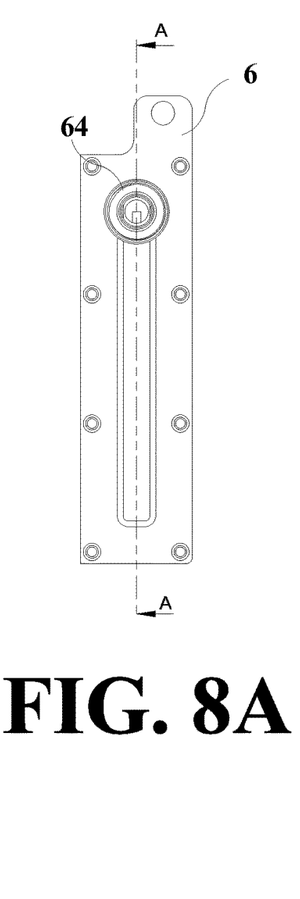
FIG. 8A and FIG. 8B show a top view diagram and a cross-section diagram crossing along to the A-A line in the top view diagram of the liquid electrolytic device in the embodiment in FIG. 1A of the present invention.
Figure 8B:
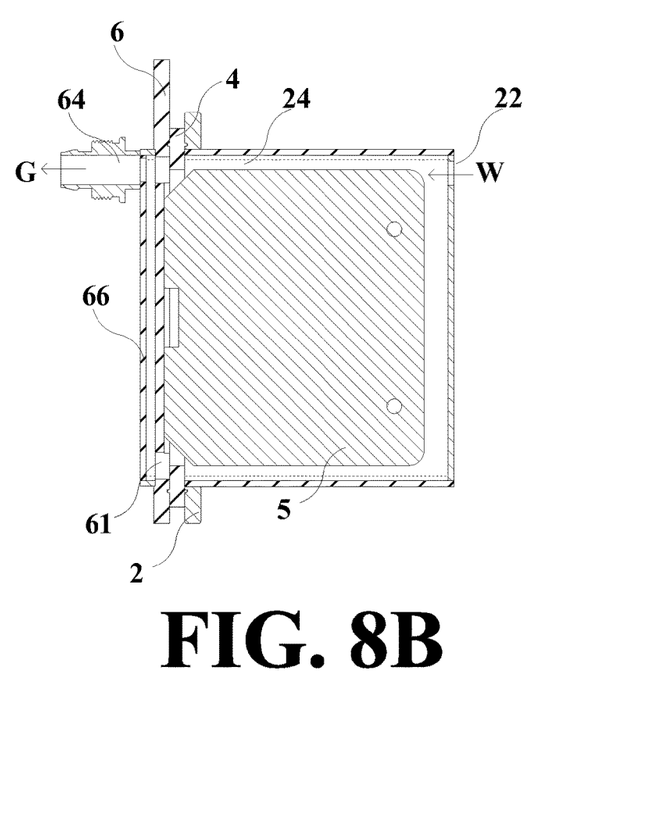

Please refer to FIG. 1A, FIG. 1B, FIG. 8A, and FIG. 8B. FIG. 8A and FIG. 8B show a top view diagram and a cross-section diagram crossing along to the A-A line in the top view diagram of the liquid electrolytic device in the embodiment in FIG. 1A of the present invention. It is worth noting that some units, such as the valve 26, are designedly omitted in the FIG. 8A and FIG. 8B. After combination, each separator 4 is covered on electrolytic tank 2 corresponding to the surface of the upper opening 20 of the electrolytic tank 2. Each cover body 6 is disposed on the other surface of each separator 4 relative to each electrolytic tank 2. The upper portion 50 of each electrode plate 5 is embedded in the fixed portion 62 of each cover body 6. The under portion 52 of the electrode plate 5 is penetrated into the hollow portion 24 of the electrolytic tank 2 via the first opening 42 of the corresponding separator 4 and the upper opening 20 of the electrolytic tank 2.

In practical application, the liquid water W is inputted into the hollow portion 24 of the electrolytic tank 2 via the under opening 22. The electrolytic tank 2 and the electrode plate 5 are electrically connected to a power source (not shown in the figure) with an opposite polarity respectively for electrolyzing the liquid water W in the electrolytic tank 2 to generate the hydrogen-oxygen gas G. The hydrogen-oxygen gas G is outputted via the cover hole 61 connected to the upper opening 20 of each electrolytic tank 2, mixed by the confluence unit 66, and outputted to a corresponding gas outputting tube 64.

Figure 7A:
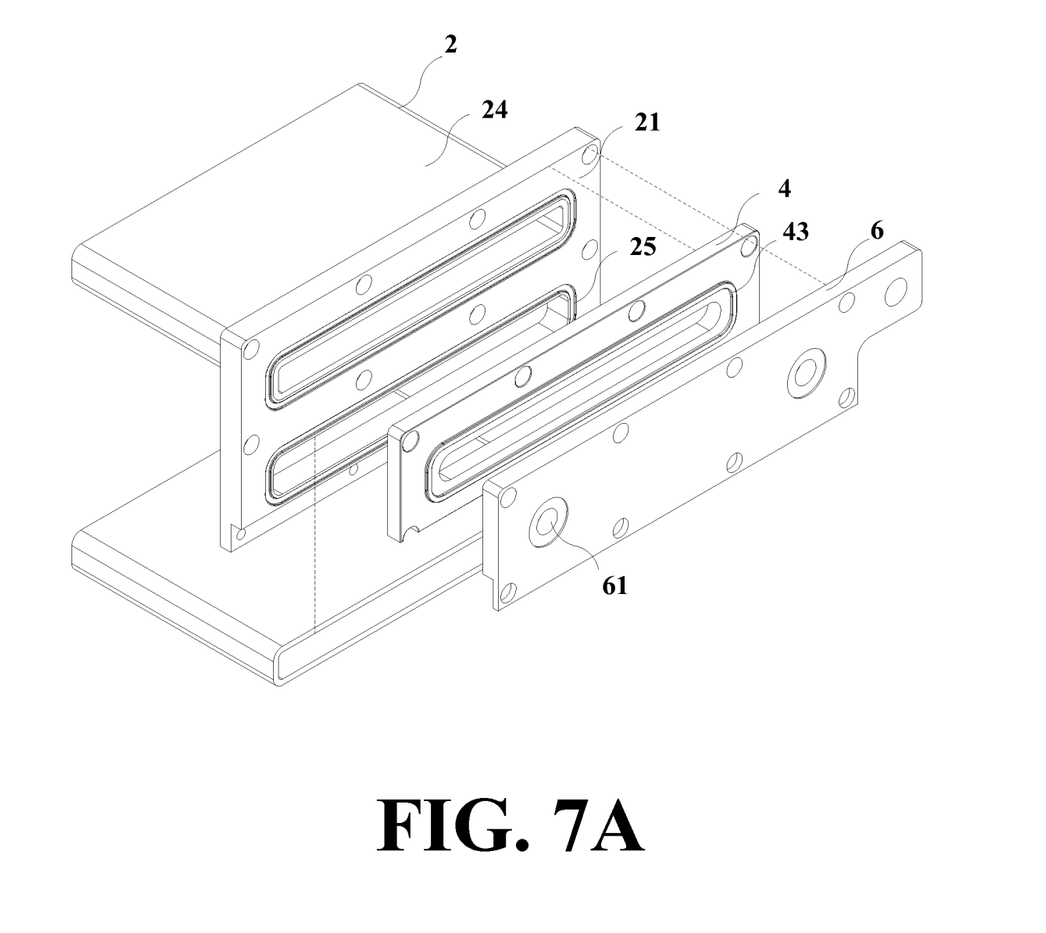
FIG. 7A and FIG. 7B show an explosion diagram with different visual angle of the embodiment in FIG. 1A, which only has the combination of electrolytic tank, separator and cover body.
Figure 7B:
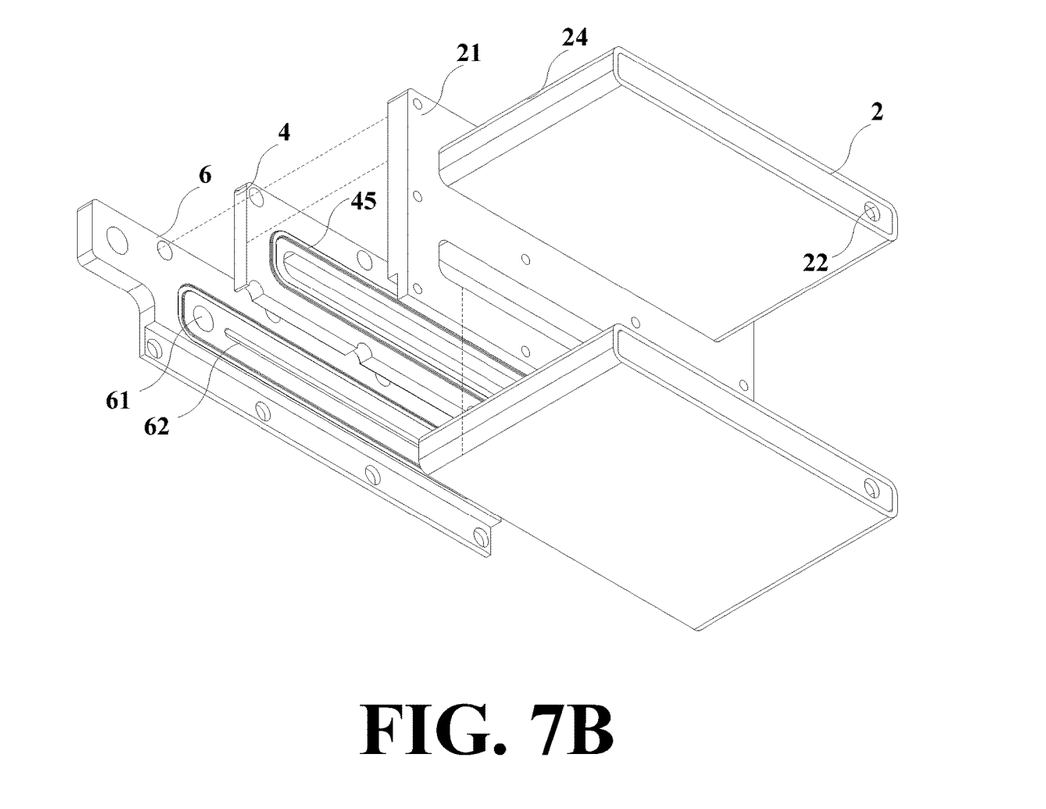

Additionally, please refer to FIG. 7A and FIG. 7B. FIG. 7A and FIG. 7B show an explosion diagram with different visual angle of the embodiment in FIG. 1A, which only has the combination of electrolytic tank, separator and cover body. Besides each design mentioned above, the cover body 6 and the corresponding surface of the separator 4 can have a first embed structure 63 and a corresponding second embed structure 43 respectively, wherein the first embed structure 63 is embedded with the second embed structure 43. The fixed portion 62 and the cover hole 61 are enclosed by the first embed structure 63, and the first opening 42 of the separator 4 is enclosed by the second embed structure 43.

Similarly, each electrolytic tank 2 and the corresponding surface of the separator 4 can have a third embed structure 25 and a corresponding forth embed structure 45 respectively. The upper opening 20 of the electrolytic tank 2 is enclosed by the third embed structure 25, and the first opening 42 of the separator 4 is enclosed by the forth embed structure 45.

Additionally, please refer to FIG. 1A and FIG. 1B. The plurality of the horizontal pits 47 are corresponding to the tongue portion 21 and the vertical vias 210 and the cover hole 61 of the cover body 6 for allowing a fixing unit 3 to pass through the tongue portion 21 and the vertical vias 210 and the cover hole 61 of the cover body 6 through the horizontal pit 47.

In practical application, the electrically connection method of the plurality of electrolytic tanks 2 is connected in parallel, which means each electrolytic tank 2 is looked as a negative pole and electrically connected to a conductor unit (not shown in the figure) of the power source, and each electrode plate 5 (which is looked as a positive pole) is electrically connected to the conductor unit (not shown in the figure) with opposite polarity of the power source. In this embodiment, when the liquid electrolytic device 1 has seven electrolytic tanks 2 connected in parallel, the voltage and current outputted from the power source (not shown in the figure) are 5V and 350 A, which means the power of each electrolytic tank 2 is about 250 Watt (50V*50 A). Therefore, the present invention can electrolyze water to generate hydrogen-oxygen gas at a lower voltage. Through the electrolytic tanks are connected in parallel, the total quantity of the outputted gas can be increased.

To summarize the statement mentioned above, the present invention provides a liquid electrolytic device, comprising electrolytic tank, separator, cover body, and electrode plate. The liquid electrolytic device of the present invention can be used to electrolyze liquid water generate hydrogen-oxygen gas. The plurality of cover bodies of the present invention are combined through the design of the first wing portion, the second wing portion, and the connecting unit. The electrolytic tank is combined through the design of the first jut, the second jut, and the latching member. An emphasis of the present invention is to provide a liquid electrolytic device which can adjust the quantity of the electrolytic tanks freely for controlling the generated quantity of the hydrogen-oxygen gas. Meanwhile, the removable design of the electrolytic tanks allows the user to freely adjust the quantity of the electrolytic tanks according to the required quantity of the gas, which is more convenient to the user.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A liquid electrolytic device, used to electrolyze liquid water and generate hydrogen-oxygen gas, comprising:
   an electrolytic tank, comprising an upper opening, an under opening, and a hollow portion, wherein the upper opening is connected with the under opening through the hollow portion, the hollow portion is adapted to contain liquid water, and the electrolytic tank is an electric conductor;

a separator, comprising a first opening, wherein the separator is covered on electrolytic tank corresponding to the surface of the upper opening of the electrolytic tank, wherein the separator is an electric insulator;

a cover body, disposed on the other surface of the separator relative to the electrolytic tank, wherein the cover body is an electric conductor and comprises a fixed portion and a cover hole, the cover hole is connected with the two surfaces of the cover body relative to the direction of the separator; and an electrode plate, having an upper portion and an under portion, wherein the upper portion of the electrode plate is embedded in the fixed portion of the cover body, the under portion of the electrode plate is penetrated into the hollow portion of the electrolytic tank via the first opening of the separator and the upper opening of the electrolytic tank;

wherein, the liquid water is inputted into the hollow portion of the electrolytic tank via the under opening, the electrolytic tank and the electrode plate are connected to a power source with an opposite polarity respectively for electrolyzing the liquid water in the electrolytic tank to generate the hydrogen-oxygen gas, wherein the hydrogen-oxygen gas is outputted via the cover hole.

2. The liquid electrolytic device of claim 1, wherein the electrolytic tank further comprises a valve, connected to the under opening of the electrolytic tank, and the electrolytic tank outputs the liquid water through the valve.

3. The liquid electrolytic device of claim 2, comprising a plurality of the electrolytic tanks, wherein the liquid electrolytic device further comprises a branch unit, configured between the valve and the under opening of the plurality of the electrolytic tanks and connected with the valve and the under opening of the plurality of the electrolytic tanks, wherein the branch unit is adapted to bypass the liquid water inputted by the valve and then output to the plurality of the electrolytic tanks.

4. The liquid electrolytic device of claim 1, comprising a plurality of the electrolytic tanks and a plurality of the corresponding separators, wherein the cover body comprises a plurality of cover holes, connected to the upper opening of the plurality of the electrolytic tanks respectively, the cover body comprises a confluence unit, wherein the confluence unit is disposed on the other surface of the cover body relative to the electrolytic tank, the confluence unit is connected to the plurality of cover holes, the confluence unit is adapted to mix the gas outputted from the plurality of cover holes and then output to a corresponding gas outputting tube.

5. The liquid electrolytic device of claim 1, wherein the cover body further comprises a gas outputting tube, the gas outputting tube is configured on the other surface of the cover body relative to the electrolytic tank and connected to the corresponding cover hole for receiving the hydrogen-oxygen gas.

6. The liquid electrolytic device of claim 1, wherein the cover body and the corresponding surface of the separator have a first embed structure and a corresponding second embed structure respectively, wherein the first embed structure is embedded with the second embed structure, the fixed portion and the cover hole are enclosed by the first embed structure, and the first opening of the separator is enclosed by the second embed structure.

7. The liquid electrolytic device of claim 1, wherein the electrolytic tank further has a tongue portion, the tongue portion is extended from a side surface of one end of the electrolytic tank relative to the separator and along to the direction of the normal vector of the side surface, the tongue portion has a plurality of vertical vias, and the plurality of vertical vias are adapted to be fixed with the cover body through a fixing unit.

8. The liquid electrolytic device of claim 7, wherein the electrolytic tank and the corresponding surface of the separator have a third embed structure and a corresponding forth embed structure respectively, the upper opening of the electrolytic tank is enclosed by the third embed structure, and the first opening of the separator is enclosed by the forth embed structure.

9. The liquid electrolytic device of claim 7, comprising a plurality of the electrolytic tanks, the tongue portion of the plurality of the electrolytic tanks comprise a first jut and a second jut respectively, extended from the side surface of the tongue portion along to the two opposite directions respectively, and the first jut of the electrolytic tank is embedded with the adjacent second jut of the electrolytic tank for fixing.

10. The liquid electrolytic device of claim 9, wherein the first jut and the second jut forms a ladder shape, a latching member is set between the first jut and the second jut, wherein the latching member forms a ladder shape.

11. The liquid electrolytic device of claim 10, wherein the first jut, the second jut, and the latching member comprise at least one longitudinal via respectively, the first jut, the second jut, and the latching member are embedded with each other and the relative position of the first jut, the second jut, and the latching member can be fixed by a fixing unit through passing through the plurality of longitudinal vias.

12. The liquid electrolytic device of claim 7, wherein the separator has at least one horizontal pit, the horizontal pit is formed by denting inside from a side surface of the separator, the plurality of the horizontal pits are corresponding to the tongue portion and the vertical vias and the cover hole of the cover body for allowing a fixing unit to pass through the tongue portion and the vertical vias and the cover hole of the cover body through the horizontal pit.

13. The liquid electrolytic device of claim 1, comprising a plurality of the electrolytic tanks and a plurality of the corresponding cover body, wherein the cover body comprises a first wing portion and a second wing portion respectively, extended from the side surface of the cover body along to the two opposite directions respectively, and the first wing portion of the cover body is embedded with the adjacent second wing portion of the cover body for fixing.

14. The liquid electrolytic device of claim 13, wherein a connecting unit is set between the first wing portion and the second wing portion, the first wing portion, the second wing portion, and the connecting unit comprise at least one longitudinal via respectively, the first wing portion, the second wing portion, and the connecting unit are embedded with each other and the relative position of the first wing portion, the second wing portion, and the connecting unit can be fixed by a fixing unit through passing through the plurality of longitudinal vias.

* * * * *